March 5, 1963  G. S. WING  3,079,819
FAST LEAD-IN POWER DRIVE SOCKET
Filed Jan. 25, 1961

INVENTOR.
GEORGE S. WING
BY
Angus & Mow
ATTORNEYS.

United States Patent Office 3,079,819
Patented Mar. 5, 1963

3,079,819
FAST LEAD-IN POWER DRIVE SOCKET
George S. Wing, Palos Verdes Estates, Calif., assignor to Hi-Shear Corporation, Torrance, Calif., a corporation of California
Filed Jan. 25, 1961, Ser. No. 84,944
5 Claims. (Cl. 81—121)

This invention relates to a fast lead-in power drive socket.

The object of this invention is to provide a drive socket for use with power tools that is able to engage the prismatic head of fastener while the socket is turning, and then to tighten down the fastener. It has long been a problem in tightening down nuts and bolts with power tools to get a drive socket quickly engaged with the fastener head. When an attempt is made to apply a conventional socket to a prismatic head while the socket is turning, it is found to be nearly impossible to get the socket engaged to the fastener. The socket will simply ratchet along the fastener, and not engage it. Accordingly, conventional sockets must be allowed to come to a stop, the socket must then be rotated to fit on to the fastener head, and then the socket can be turned again. This is, of course, a time-consuming procedure. Particularly in production-line applications, it is very undesirable. For production-line purposes, it is desirable to go quickly from one fastener to the next without even turning off the power, and certainly without waiting for the socket to stop.

Accordingly, an object of this invention is to provide a socket which is able to make a firm driving engagement with a fastener to be driven, and which can engage a non-rotating fastener head while the socket is still turning, thereby greatly speeding up the assembly process.

A fast lead-in power drive socket according to this invention comprises a body having a central axis of rotation that is adapted to be driven by a power source. An internal axial cavity opens at one end of this body and the cavity is defined by the following surfaces: $n$ lead-in surfaces which are fragments of surfaces of revolution generated by a line revolved around the central axis, these surfaces all being concave, $n$ planar driving surfaces which lie parallel to the central axis and intersect respective ones of the lead-in surfaces, a trailing surface for each of said driving surfaces which forms a dihedral angle with its respective driving surface, each dihedral angle opening away from the axis, each dihedral edge lying parallel to the axis, and the respective lead-in surfaces lying within the dihedral angle and being bounded at least in part by its respective pair of driving and trailing surfaces. Each pair of driving and trailing surfaces is spaced apart from an adjacent pair by a guiding surface which is a fragment of a cylinder that has its axis coincident with the central axis of rotation.

According to a preferred but optional feature of the invention, both the driving and trailing surfaces are planar, and each dihedral angle is equal to $$\frac{180n-120}{n}$$

degrees, and the angular subtense of the cylindrical fragments is $$\frac{120}{n}$$

degrees, in order to drive a fastener having $n$ engaging faces.

The above and other features of this invention will be fully understood from the following detailed description and the accompanying drawings in which.

Figure 1:
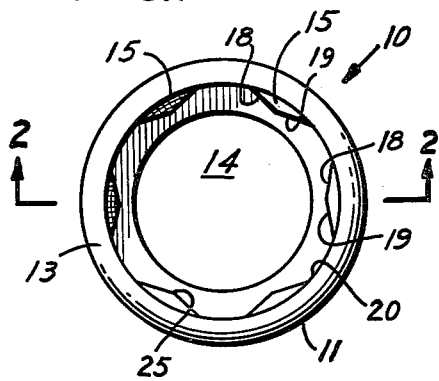
FIG. 1 is an end view of the presently preferred embodiment of the invention.

The presently preferred embodiment of a fast lead-in power drive socket 10 according to the invention is shown in FIG. 1. The particular embodiment illustrated is adapted to drive a fastener such as a nut or a bolt head having a regular hexagonal prism for an engaging surface. The socket comprises a body 11 which is adapted to be attached to a power source (not shown) which might be a drill motor, for example. The body has a central axis of rotation 12 which will be coincident with that of the power source.

At face 13 of the body, there is a cavity 14 for receiving the fastener to be driven. The object of the invention is to get the fastener into the cavity while the body is turning.

The cavity is defined by a plurality of surfaces in number referable to the number of faces of the fastener to be driven. This number will be referred to as $n$. In a square fastener, $n$ equals 4; in a hexagonal fastener, $n$ equals 6; and in a 12-face fastener, $n$ equals 12. It will be noted that the 12-point fastener of FIG. 4 actually has 24 engaging surfaces, however this is simply the equivalent of forming each drive face in two portions. Note that in the fasteners of FIGS. 3 and 5, a single face can be used to drive the fastener in both directions while in the fastener in FIG. 4, each face is useful for driving in only one direction. Therefore, the number $n$, as used herein, relates to the number of sides of a regular prism such as those shown in FIGS. 3 and 5 and half the number of faces of a pointed prism having external points as in FIG. 4.

Figure 2:
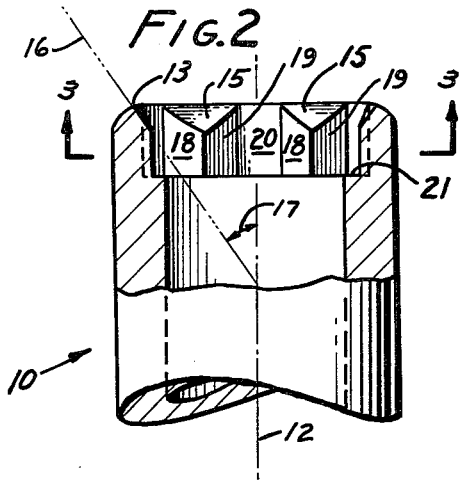
FIG. 2 is a cross section taken at line 2—2 of FIG. 1.

Lead-in surfaces 15 define portions of the cavity. These surfaces are concave toward the central axis. All of them are fragments of a single surface of revolution which is generated by a line revolved around the central axis, the line intersecting the axis and making an acute angle therewith. For example, in the embodiment of FIG. 1, the generator 16 of all the lead-in surfaces is a straight line making an acute angle 17 with the central axis. This angle is conveniently about 35°. The lead-in surfaces as illustrated in FIG. 2 are fragments of a conical frustum which is the presently preferred embodiment, but fragments of other concave surfaces could be used, such as fragments of a sphere or conoids. And, of course, other angularities could be used.

The cavity is further defined by $n$ pairs of driving surfaces 18, 19. These driving surfaces are planar. Each pair intersects to form a dihedral angle which opens away from the central axis. In the presently preferred embodiment of the invention, this dihedral angle equals $$\frac{180n-120}{n}$$

degrees. Surfaces 19 are sometimes called "trailing surfaces." A trailing surface is the one of the pairs of surfaces not used for driving in a given direction of rotation.

Each pair of driving surfaces is spaced apart by a guiding surface 20. There are $n$ guiding surfaces. Each of them is an arcuate surface which is a fragment of a single cylinder that has its axis coincident with the central axis. The radius of each of the guiding surfaces is slightly greater than the major dimension of the head of the fastener to be engaged, so that the guiding surfaces tend to center the fastener head in the cavity. The angular subtense of each of the guiding surfaces is $$\frac{120}{n}$$

degrees.

The bottom of the cavity is preferably, but not necessarily, partially defined by a shoulder 21 which will limit the distance the fastener can enter the cavity. It is to be understood that instead of the shoulder, the limiting feature could be the engagement of the end of the body against the surface being driven, but ordinarily this is not desirable because it may tend to scar the said body. It is better to exert the limitation on the fastener itself.

With particular respect to the angular values of the various configurations, reference will now be had to FIGS. 1–5. Using the above equations, it will be seen that a structure for driving a hexagonal fastener such as fastener 22, which is shown in dashed line in driving position, has guiding surfaces with angular subtense defined by angle 23 of 20°, while dihedral angle 24 is 160°. Thus there is formed a completely symmetrical socket in which surfaces 18 and 19 in all of the prismatic ribs 25 defined by them are of equal area and are spaced apart by like cylindrical fragments. The result is that this socket can be used in bi-directional rotation to tighten fasteners of either hand, or to tighten and untighten fasteners of the same hand. A firm engagement is made between each engaging surface of the fastener and one of the driving surfaces. Upon relative rotation of the socket and the fastener through 20°, faces of the opposite hand will be engaged.

Figure 3:
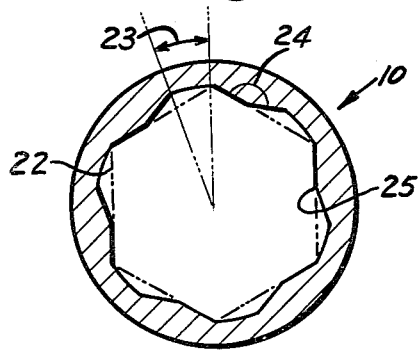
FIG. 3 is a cross section taken at line 3—3 of FIG. 2.
Figure 4:
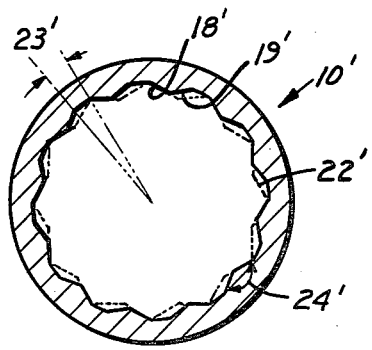
FIGS. 4 and 5 are cross sections of alternate embodiments of the invention taken at sections analogous to that of line 3—3 in FIG. 2.
Figure 5:
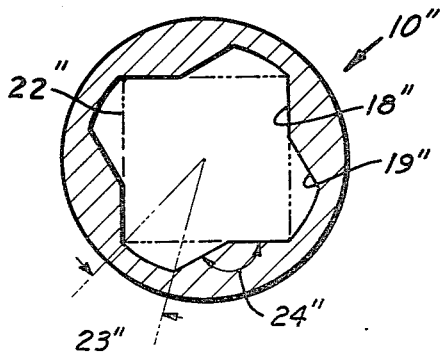

Surfaces and fasteners in FIGS. 4 and 5 are numbered with primes and double-primes respectively relative to the surfaces and fasteners defined in FIGS. 1–3. A 12-pointed fastener 22' is shown being driven in FIG. 4 and in this event, the number of driving surfaces which are regularly arrayed is 12, so that angle 23' is 10° and angle 24' is 170°.

In FIG. 5, a square fastener 22" is being driven and in this case angle 23" is 30° and dihedral angle 24" is 130°.

It will be noted from FIGS. 3–5 that all cross-sections normal to the central axis are regular shapes in the sense that repetitive angles and surfaces are of the same size and shape.

This invention provides a fast lead-in drive socket which can be operated at full speed while being pressed onto a non-rotating prismatic fastener head without ratching.

This invention is not to be limited by the embodiments shown in the drawings and described in the description which are given by way of example and not of limitation, but only in accordance with the scope of the appended claims.

I claim:

1. A fast lead-in power drive socket adapted to engage a prismatic driving section of a threaded fastener while the socket is turning and then to turn the fastener, comprising a body having a central axis of rotation and an internal axial cavity opening at one face thereof, said cavity being defined by the following surfaces; $n$ lead-in surfaces, each comprising a concave fragment of a single surface of revolution generated by a line revolved around the central axis, all portions of the line which generates the lead-in surfaces making an acute angle relative to the central axis, $n$ pairs of planar driving surfaces lying parallel to the central axis and intercepting respective ones of the lead-in surfaces, each pair of driving surfaces forming a dihedral angle of $$\frac{180n - 120}{n}$$

degrees opening away from the central axis, a guiding surface separating each pair of driving surfaces, each guiding surface comprising an arcuate surface which is a fragment of a single cylinder having its axis coincident with said central axis, and having an angular subtense at the central axis equal to $$\frac{120}{n}$$

degrees, each said guiding surface also spacing apart a pair of adjacent lead-in surfaces, whereby said socket is adapted to engage and drive a fastener having $n$-engaging faces, the lead-in surfaces serving to lead the dihedral edges of the fastener toward the guiding surfaces, and the relief formed by the guiding surfaces enabling the driving section to enter the cavity beyond the lead-in surfaces, before the engaging and driving surfaces make contact, engagement of the driving and engaging faces enabling the fastener to be driven by the socket.

2. A fast lead-in power drive socket according to claim 1 in which a transverse shoulder is formed in the cavity at an axial distance thereinto from the lead-in surfaces to limit the distance the fastener can enter the body.

3. A fast lead-in power drive socket adapted to engage a prismatic driving section of a threaded fastener to tighten the same, comprising a body having a central axis of rotation and an internal axial cavity opening at one face thereof, said cavity being defined by the following surfaces: $n$ lead-in surfaces, each comprising a concave fragment of a single surface of revolution generated by a line revolved around the central axis, all portions of the line which generates the lead-in surfaces making an acute angle relative to the central axis, $n$ planar driving surfaces lying parallel to the central axis and intersecting respective ones of the lead-in surfaces, a trailing surface for each of said driving surfaces forming a dihedral angle with its respective driving surface, which dihedral angles open away from the central axis, the edge of each dihedral angle being parallel to the axis, each respective lead-in surface being bounded in part by a respective driving and trailing surface and lying inside the dihedral angle, a guiding surface separating each of the pairs of driving and trailing surfaces, each guiding surface comprising an arcuate surface which is a fragment of a single cylinder having its axis coincident with said central axis, each said guiding surface also spacing apart a pair of adjacent lead-in surfaces, whereby said socket is adapted to engage and drive a fastener having $n$ engaging faces, the lead-in surfaces serving to lead the dihedral edges of the fastener toward the guiding surfaces, and the relief formed by the guiding surfaces enabling the driving section to enter the cavity beyond the lead-in surfaces before the engaging and driving surfaces makes contact, engagement of the driving and engaging faces enabling the fastener to be driven by the socket.

4. A fast lead-in power drive socket according to claim 3 in which a transverse shoulder is formed in the cavity at an axial distance thereinto from the lead-in surfaces to limit the distance the fastener can enter the body.

5. A fast lead-in power drive socket according to claim 3 in which both the driving and trailing surfaces are planar and parallel to the said central axis.

References Cited in the file of this patent

UNITED STATES PATENTS

| | | |
|---|---|---|
| 2,774,259 | Caulkins | Dec. 18, 1956 |
| 2,777,353 | Willis | Jan. 15, 1957 |
| 2,848,916 | Reynolds | Aug. 26, 1958 |
| 2,898,793 | Fedeson | Aug. 11, 1959 |

FOREIGN PATENTS

| | | |
|---|---|---|
| 281,431 | Great Britain | Dec. 8, 1927 |